United States Patent
Feng (10) Patent No.: US 7,574,550 B2
(45) Date of Patent: Aug. 11, 2009

(54) GUARANTEED ISOCHRONOUS SERVICES METHOD AND APPARATUS IN BRIDGED LAN

(75) Inventor: Fei fei Feng, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 206 days.

(21) Appl. No.: 11/412,826

(22) Filed: Apr. 28, 2006

(65) Prior Publication Data

US 2006/0268903 A1    Nov. 30, 2006

Related U.S. Application Data

(60) Provisional application No. 60/675,465, filed on Apr. 28, 2005, provisional application No. 60/699,387, filed on Jul. 15, 2005.

(30) Foreign Application Priority Data

Mar. 9, 2006    (KR) .................... 10-2006-0022183

(51) Int. Cl.
    *G06F 13/36*    (2006.01)
    *G06F 13/42*    (2006.01)
    *H04L 12/28*    (2006.01)
    *G06F 15/16*    (2006.01)

(52) U.S. Cl. ............... 710/311; 710/314; 710/105; 710/306; 370/395.2; 709/231

(58) Field of Classification Search ......... 710/305–315, 710/38, 105, 106; 709/230–232; 370/395.2, 370/395.21, 395.43, 395.31
See application file for complete search history.

(56) References Cited

U.S. PATENT DOCUMENTS

| | | | | |
|---|---|---|---|---|
| 6,557,067 | B1* | 4/2003 | James et al. | 710/306 |
| 6,611,892 | B1* | 8/2003 | Sasaki et al. | 710/306 |
| 6,751,697 | B1* | 6/2004 | Shima et al. | 710/306 |
| 6,910,090 | B1* | 6/2005 | Scheel et al. | 710/306 |
| 2001/0037422 | A1* | 11/2001 | Thaler et al. | 710/126 |
| 2003/0053466 | A1* | 3/2003 | Bizet et al. | 370/401 |

FOREIGN PATENT DOCUMENTS

| | | | |
|---|---|---|---|
| EP | 933900 A2 | * | 8/1999 |
| EP | 1113625 A2 | * | 7/2001 |
| WO | WO 01/38996 | * | 5/2001 |

OTHER PUBLICATIONS

Kim, Mihui et al. "Dynamic VLAN Registration Mechanism on EoMPLS". IEEE. 2003. pp. 208-212.*

(Continued)

*Primary Examiner*—Thomas J Cleary
(74) *Attorney, Agent, or Firm*—Sughrue Mion, PLLC (57) ABSTRACT

Provided are a guaranteed isochronous services method and apparatus in bridged LAN. Isochronous streams are transmitted through bridges to a plurality of listener stations in a distributed network, and each bridge performs filtering, stream group registration and authentication for the isochronous streams. Accordingly, quality of service (QoS) in a distributed network can be improved. Furthermore, isochronous streams to the plurality of listener stations can be guaranteed.

19 Claims, 10 Drawing Sheets

OTHER PUBLICATIONS

Feng, Feifei et al. "End-to-end Stream Establishment in Consumer Home Networks". IEEE. 2006 Consumer Communications and Networking Conference. Jan. 8-10, 2006. pp. 888-891.*

Feng, Felix. "GARP Stream Reservation Protocol".Initial Draft. Dec. 29, 2005.*

Choi, Jinseek. Centralized Admission Control Mechanism for SRP. Jul. 2006.*

Feng, Felix Feifei. "GARP-based Simple Reservation Protocol". IEEE 802.3 RESG. Jul. 2005. San Francisco, CA, USA.*

* cited by examiner

FIG. 2

→ : Propagation of RESV

FIG. 3

→ : RESV with a "SUCCESSFUL"SI

---▶ : RESV with a "FAILED"SI

GUARANTEED ISOCHRONOUS SERVICES METHOD AND APPARATUS IN BRIDGED LAN

CROSS-REFERENCE TO RELATED APPLICATIONS

This application claims priority from Korean Patent Application No. 10-2006-22183 filed on Mar. 9, 2006, in the Korean Intellectual Property Office and from U.S. Provisional Patent Application No. 60/699,387 filed on Jul. 15, 2005, and U.S. Provisional Patent Application No. 60/675,465 filed on Apr. 28, 2005 in the United States Patent and Trademark Office, the disclosures of which are incorporated herein by reference.

BACKGROUND OF THE INVENTION

1. Field of the Invention

The present invention relates to a guaranteed isochronous services method and apparatus in bridged LAN. More particularly, the present invention relates to a guaranteed isochronous services method and apparatus in a bridged LAN that provides isochronous streams through bridges in a distributed network, filters the isochronous streams, and registers and authenticates stream groups so that the quality of service (QoS) can be improved.

2. Description of the Related Art

Generally, a bridge apparatus for a distributed network connects two or more local area networks (LANs) employing the same protocol. The bridge apparatus can also connect two segments to the same LAN.

IEEE 802.1 defines standard characteristic of a bridge. A basic bridge has a plurality of ports connected to a plurality of separated LANs. A frame received at one port is re-transmitted to another port. The bridge re-transmits all data frame irrespective of whether or not it is necessary. A learning bridge investigates a source field of the entire data frame found in each port to generate a table that defines each port as connected to a particular address.

Accordingly, if the data frame that is addressed to a destination is found in its own address table, the bridge transmits the data frame only to the port related to the address, unless the destination address is connected to the same port to input the data frame.

Various protocols have been introduced to provide optimal quality of service (QoS) when data is transmitted through the bridge in the distributed network. For example, the various protocols include differentiated services (Diffserv), integrated services (Intserv), and resource reservation protocol (RSVP).

In case of RSVP, subnet bandwidth managers (SBM) for LAN are variant, and the RSVP has a high complexity and is unfriendly to IEEE 802.1.

In case of the link layer reservation management protocol (LLRMP), which is a source initiated resource reservation, the integration with isochronous service is not considered.

In case of the listener station initiating protocol based on generic attribute registration protocol (GARP), no reservation is necessary and no justification exists.

In case of the listener station initiating protocol based on the RSVP, it has a high complexity and is unfriendly to IEEE 802.1.

SUMMARY OF THE INVENTION

The present invention has been conceived to address the above-mentioned problems occurring in the prior art. An aspect of the present invention is to provide a guaranteed isochronous services method and apparatus in a bridged LAN that isochronously provides media streams through a bridge in a distributed network, filters isochronous streams, and registers and authenticates stream groups so that the quality of service (QoS) can be improved.

According to an aspect of the present invention, there is provided a bridge apparatus that receives an isochronous stream from a talker station and relays the stream to a listener station, the bridge apparatus including a path provider which configures a relay path to relay the isochronous stream, and a stream group filtering unit which determines a filtering or a forwarding of the isochronous stream on the basis of a stream identifier allocated to each isochronous stream for isochronous stream services in the configured relay path.

The bridge apparatus further includes a reservation status database, and the stream group filtering unit forwards the isochronous stream depending on the reservation status database.

The stream identifier includes a virtual local area network (VLAN) tag, a password, or media access control (MAC) address.

The reservation status database includes a stream filtering database that specifies a certain outbound port to forward or filter the isochronous stream.

The isochronous stream is forwarded through the outbound port explicitly enabled in the stream filtering database.

The stream filtering database includes static filtering entries, dynamic filtering entries, group registration entries, and stream group registration entries.

The stream group registration entries include an isochronous stream identifier, a reservation port map, and a stream port map.

The reservation port map consists of a control element for each outbound port that specifies forwarding or filtering of reservation signal frame with the associated isochronous stream, and the stream port map consists of a control element for each outbound port that specifies forwarding or filtering of isochronous frames with the associated isochronous stream.

In filtering, the stream port map can have additional sub-states indicating the reason of filtering: "Initial", "Admission Control Failure", "and "Time Out".

The path provider includes a stream subscription/secession protocol unit which transmits a subscription/secession request for the isochronous streams from the listener station to the talker station and transmits a response for the isochronous streams from the talker station to the listener station, and an authentication unit which provides the authenticated relay path between the talker station and the listener station on the basis of a configuration and a key for the isochronous stream services as the subscription is completed.

According to another aspect of the current invention, there is provided a guaranteed isochronous services method that receives an isochronous stream from a talker station and relays the stream to a listener station, the method including operations of configuring a relay path to relay the isochronous stream, and streaming to determine a filtering or a forwarding of the isochronous stream on the basis of a stream identifier allocated to each isochronous stream in the configured relay path.

The stream identifier includes a virtual local area network (VLAN) tag, a password, or media access control (MAC) address.

The method further includes storing a reservation status in a reservation status database, if the forwarding is determined in the streaming operation, and forwarding the isochronous stream depending on the reservation status database.

The reservation status database includes a stream filtering database that specifies a certain outbound port to forward or filter the isochronous stream.

The isochronous stream is forwarded through the outbound port explicitly enabled in the stream filtering database.

The stream filtering database includes stream group registration entries, and the group registration entries comprise an isochronous stream identifier, a reservation port map, and a stream port map. The reservation port map consists of a control element for each outbound port that specifies forwarding or filtering of reservation signal frame with the associated isochronous stream, and the stream port map consists of a control element for each outbound port that specifies forwarding or filtering of isochronous frames with the associated isochronous stream.

The operation of configuring a relay path includes operations of subscribing/seceding which transmits a subscription/secession request for the isochronous streams from the listener station to the talker station and also transmits a response for the isochronous streams from the talker station to the listener station, and authenticating which provides the authenticated relay path between the talker station and the listener station on the basis of a configuration and a key for the isochronous stream services as the subscription is completed.

The operation of subscribing/seceding uses generic attribute registration/stream reservation protocol (GSRP). If an admission control is successful, the operation of authenticating triggers admission control operations according to a reservation signaling, and locks resources.

In the operation of authenticating, the configuration is to determine whether or not the stream, which enters a bridge, is transmitted using port information on whether or not a certain port stored in the bridge can transmit a certain stream.

BRIEF DESCRIPTION OF THE DRAWINGS

The above and other aspects of the present invention will be more apparent by describing certain exemplary embodiments of the present invention with reference to the accompanying drawings, in which.

DETAILED DESCRIPTION OF THE EXEMPLARY EMBODIMENTS

Exemplary embodiments of the present invention will be described in detail with reference to the annexed drawings. In the drawings, the same elements are denoted by the same reference numerals throughout the drawings. In the following description, detailed descriptions of known functions and configurations incorporated herein have been omitted for conciseness and clarity.

Figure 1:
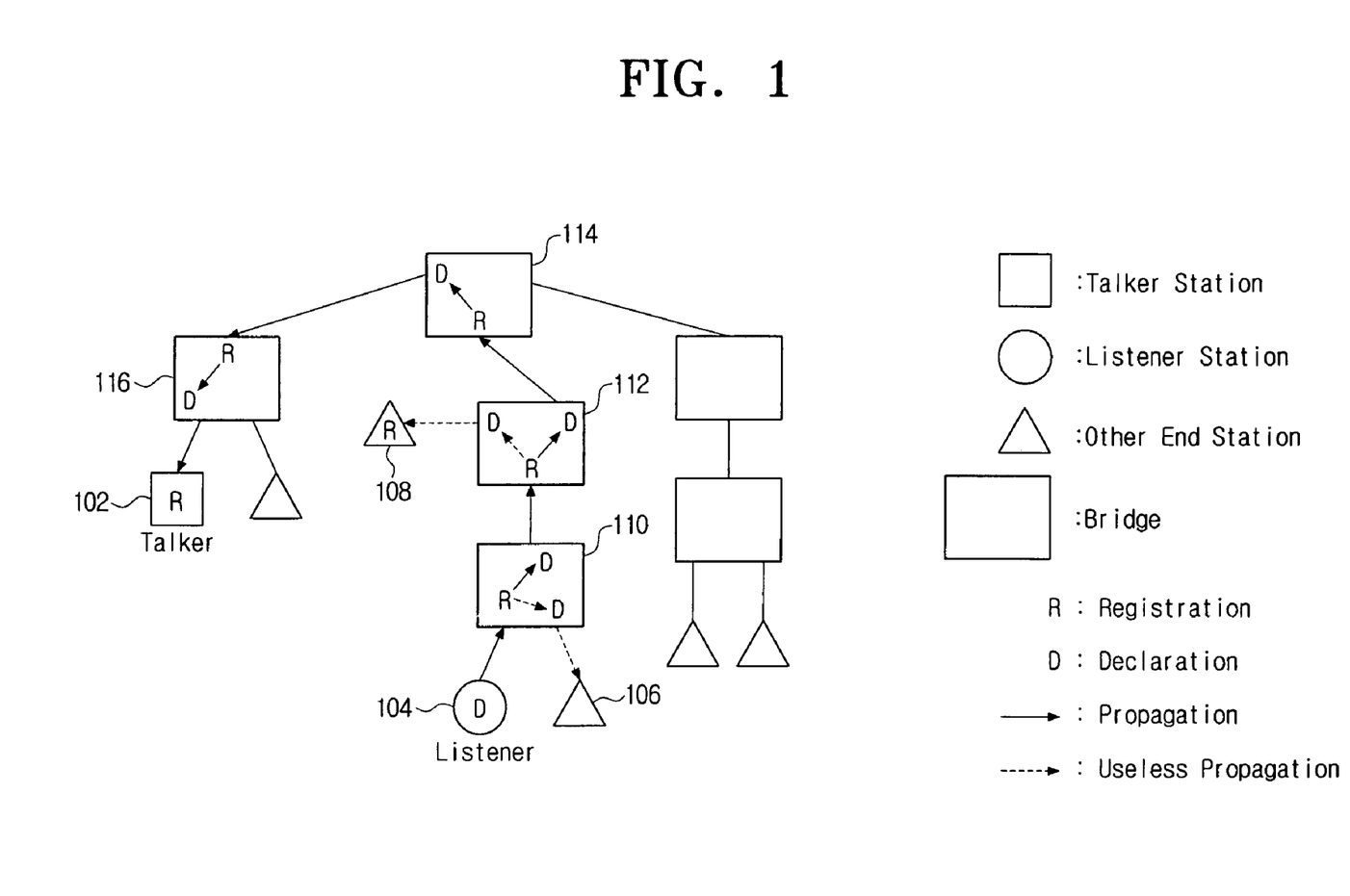
FIG. 1 is a view illustrating a process requesting an isochronous stream from a listener station to a talker station in a guaranteed isochronous services method according to an exemplary embodiment of the present invention.

FIG. 1 is a view illustrating a process requesting an isochronous stream from a listener station to a talker station in a guaranteed isochronous services method according to an exemplary embodiment of the present invention.

The guaranteed isochronous services method according to an exemplary embodiment of the present invention may be applied to a bridged LAN system. The bridged LAN system according to an exemplary embodiment of the present invention comprises a talker station 102, a listener station 104, other end stations 106 and 108, and a plurality of bridges 110-116.

The talker station 102 may include a device providing isochronous streams such as a DVD player. As the listener station 104 requests streams, the talker station 102 reserves isochronous streams for the listener station 104, and provides reservation information to the listener 104. The talker station 102 also transmits the isochronous streams to the listener station 104 according to the reservation information.

The listener station 104, such as a digital TV, may request isochronous streams and receive the isochronous streams through the bridge.

The bridges 110-116, which provide a path to relay the isochronous streams, transmit the request for media streams from the listener 104 to the talker station 102, and receive the stream reservation information from the talker station 102 to transmit to the listener station 104.

Figure 7:
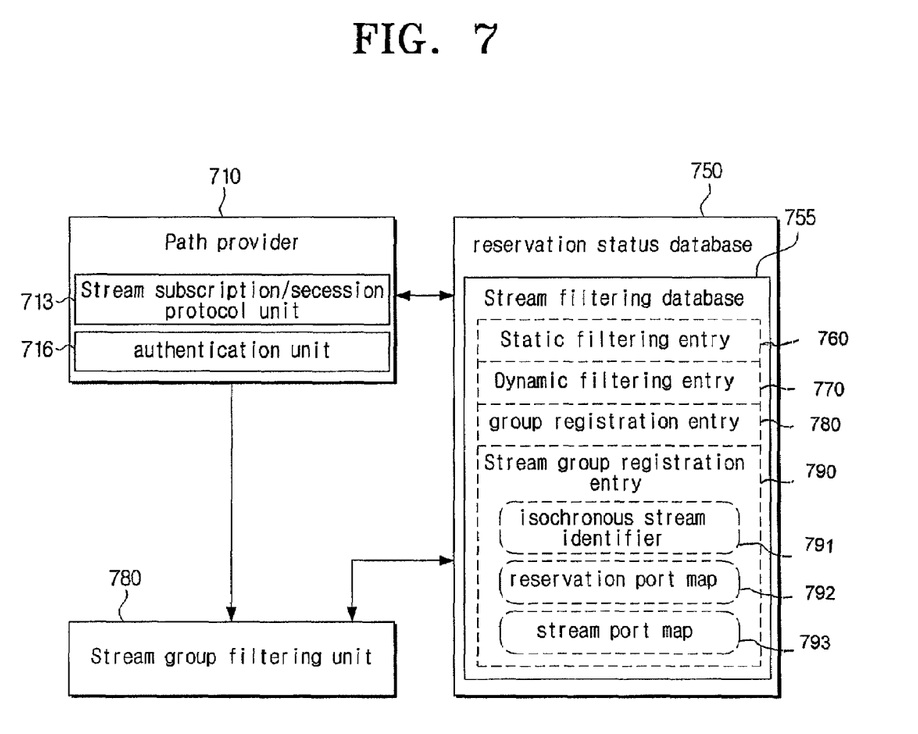
FIG. 7 is a box diagram detailing the interior components of a bridge apparatus to an exemplary embodiment of the present invention.

FIG. 7 shows a box diagram detailing the interior components of a bridge apparatus to an exemplary embodiment of the present invention. The bridges 110-116 has therein a stream group filtering unit 780, a stream subscription/secession protocol unit 713, and an authentication unit 716, both of which are part of path provider 710.

In the bridges 110-116, the stream group filtering unit 780 filters the isochronous streams received from the talker station 102 on the basis of the stream identifier assigned to each isochronous stream for isochronous stream services to determine whether or not the isochronous stream is forwarded to the listener station 104 depending on the filtering result. To this end, the bridges 110-116 comprises a reservation state database 750, and forwards the isochronous stream according to the reservation state database 750. Here, the reservation state database 750 includes the stream filtering database 755. The stream filtering database 755 defines a certain outbound port to forward the isochronous stream or filter the certain isochronous stream data frame. The default value of the stream filtering database is set to "filtering". The isochronous stream data frame is forwarded through the outbound port explicitly enabled in the stream filtering database 755.

Figure 9A:
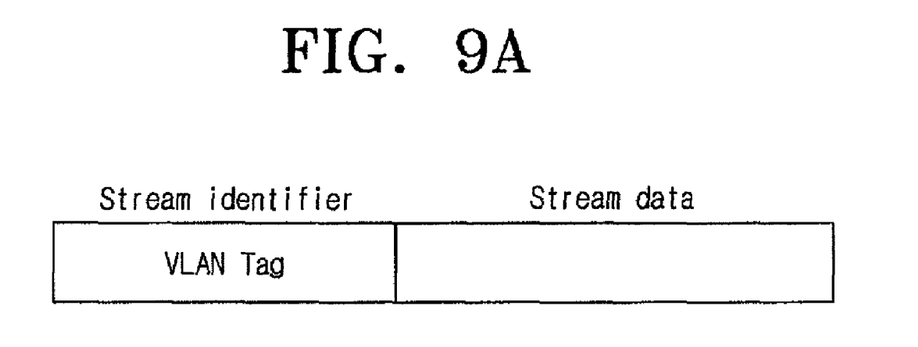
FIGS. 9A.-9C. are diagrams noting that the stream identifiers may be a VLAN tag, a password, or a MAC address according to the respective exemplary embodiments of the present invention.
Figure 9B:
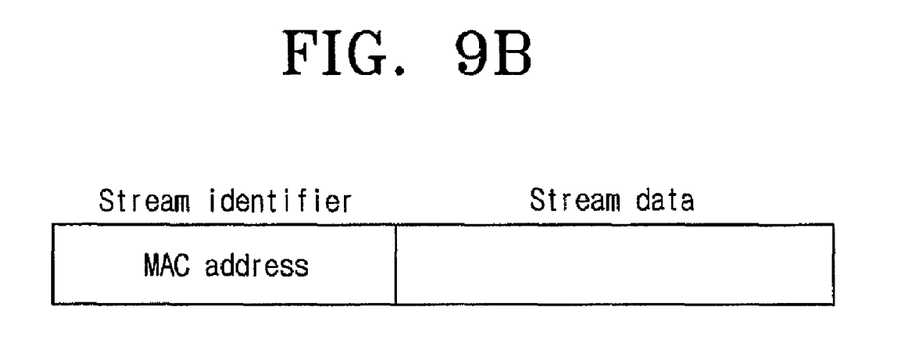
Figure 9C:
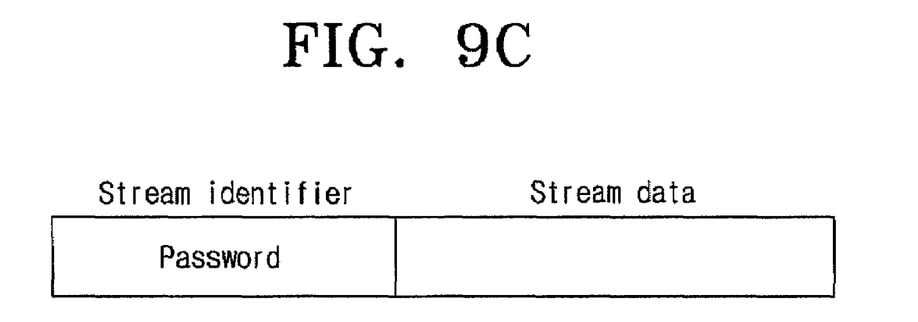

FIGS. 9A-9C detail the compositions of the stream identifier. The stream identifier comprises a virtual local area network (VLAN) tag, a password, or media access control (MAC) address.

The stream subscription/secession protocol unit 713 transmits the request for the isochronous streams from the listener station 104 to the talker station 102 so as to register the isochronous streams in the talker station 102, and receives the reservation information for the isochronous streams from the talker station 102 to transmit to the listener station 104. Here, the subscription/secession protocol 713 is employed to manage isochronous streams by updating stream filtering database 755 of each bridge along the isochronous stream paths.

The stream filtering database 755 of each of bridges 110-116 comprises static filtering entries 760, dynamic filtering entries 770, group registration entries 780, and stream group registration entries 790.

Figure 10A:
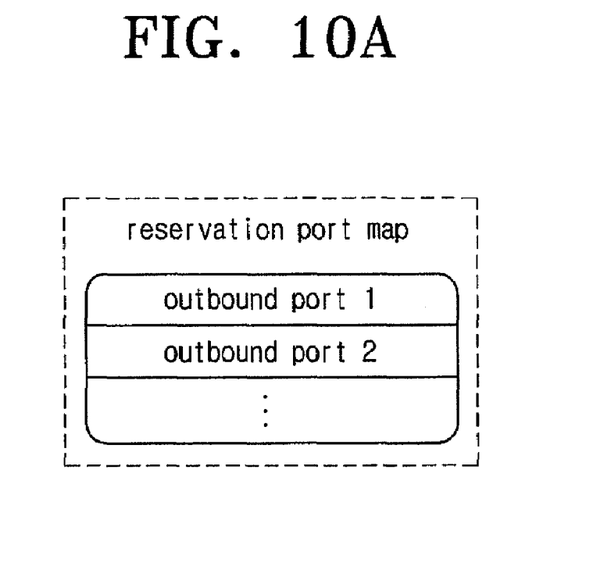
FIG. 10A is a diagram showing the structure of the reservation port map according to an exemplary embodiment of the present invention.
Figure 10B:
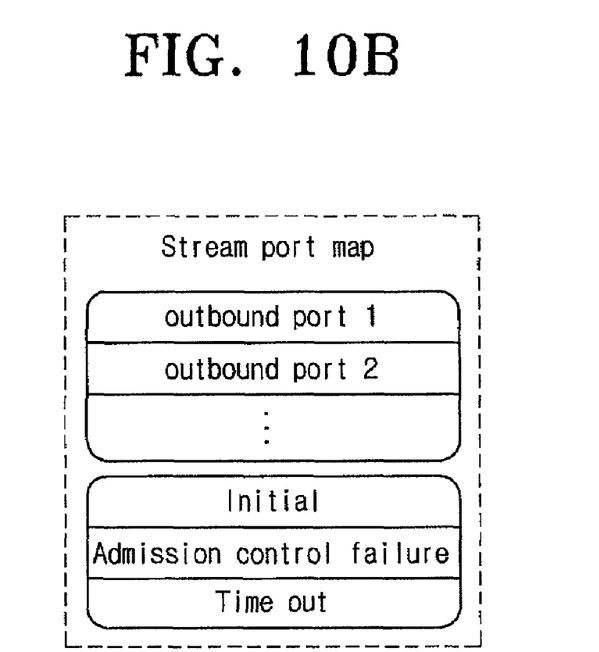
FIG. 10B. is a diagram showing the structure of the stream port map according to an exemplary embodiment of the present invention.

The stream group registration entries 790 comprise an isochronous stream identifier 791, a reservation port map 792, and a stream port map 793. As shown in FIG. 10A, the reservation port map 792 consists of a control element for each outbound port that specifies forwarding or filtering of reservation signaling frame with the associated isochronous stream. Further, as shown in FIG. 10B, the stream port map 793 consists of a control element for each outbound port that specifies forwarding or filtering of isochronous frames with the associated isochronous stream. The stream port map 793 can have additional sub-states indicating the reason of filtering: "Initial", "Admission Control Failure", "and "Time Out". Those state indicators can also be stored in another separate map. The default value of the stream port map is "Initial".

The stream group registration entries 790 are created, modified and deleted by the GARP (generic attribute registration protocol) stream reservation protocol (GSRP).

The signaling of the subscription/secession protocol frame is divided into a GARP based signaling and a reservation signaling.

The listener station 104 uses GARP to show its intention of joining specified isochronous stream. With the GARP registration, the talker station 102 and the bridges can know the location of the listener station 104 and the method sending the data to the listener station 104.

The talker station 102 transmits the reservation signaling through the bridges to the listener station 104. If an admission control is successful, the bridges triggers the admission control operations according to the reservation signaling, and locks resources.

The authentication unit 716 performs authentication between the talker station 102 and the listener station 104 on the basis of the configuration and the key of the bridges for the isochronous stream services, and authorizes connection of the accessible listener stations and talker stations in an isochronous session. The bridges are configured to determine whether or not the stream, which enters the bridges, is transmitted using the port information on whether or not a certain port stored in the bridges can transmit a certain stream.

In FIG. 1, the listener station 104 requests the talker station 102 for the isochronous streams through the bridges 110-116. Accordingly, the isochronous stream request data is transmitted through the first bridge 110, the second bridge 112, the third bridge 114, and the fourth bridge 116 to the talker station 102. In other words, the listener station 104 requests the talker station 102 for the registration of the isochronous services. Accordingly, the isochronous stream request data may be defined as the data of requesting the registration for the isochronous services.

The bridges 110-116 transmit the registration request data to the talker station 102 according to the stream subscription protocol unit. Here, the registration request data includes the stream identifier of the listener station 104.

The talker station 102 registers the listener station 104 in the isochronous stream services on the basis of the stream identifier according to the isochronous stream registration request. Also, the talker station 102 reserves the providing of the isochronous stream to the listener station 104.

With the GSRP registration, the talker station 102 and the bridges 110-116 can know the location of the listener station 104 and the method sending to the listener station 104.

Figure 2:
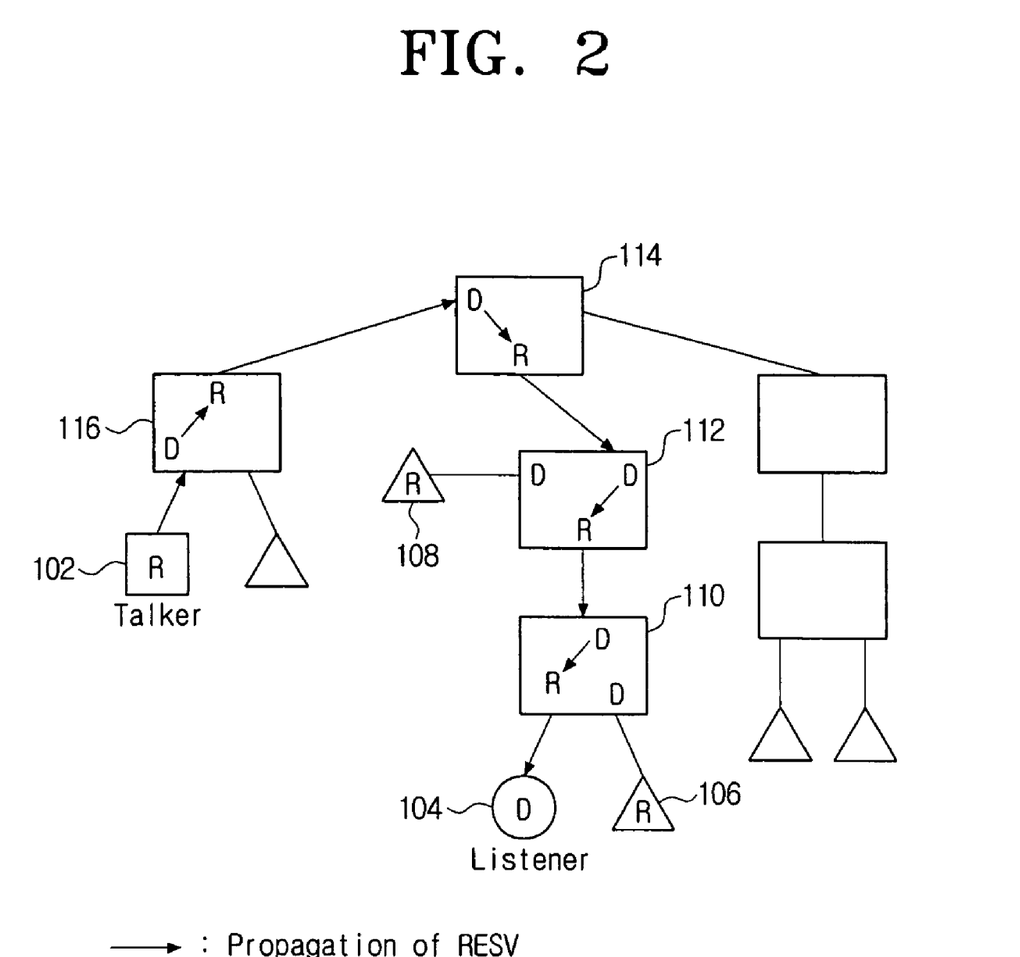
FIG. 2 is a view illustrating a process transmitting reservation signaling from a talker station to a listener station in a guaranteed isochronous services method according to an exemplary embodiment of the present invention.

FIG. 2 is a view illustrating a process transmitting reservation signaling from a talker station to a listener station in a guaranteed isochronous services method according to an exemplary embodiment of the present invention.

After registering the listener station 104 in the isochronous services, the talker station 102 transmits the reservation signaling frame, which reserves the providing of isochronous streams to the listener station 104, through the bridges 110-116. The reservation signaling frame includes a stream identifier, a talker address, a resource requirement, a subscription status, and an error code. The resource requirement includes a requested_bandwidth and a reserved_bandwidth.

If the admission control is successful for the reservation signaling frame, the bridges 110-116 trigger admission control operations. The bridges 110-116 lock the resources and updates isochronous filtering database.

The bridges 110-116 control each outbound port that specifies forwarding or filtering of the reservation signaling frame according to the reservation port map with respect to the isochronous streams.

Accordingly, the reservation signaling frame is transmitted from the talker station 102 through the fourth bridge 116, the third bridge 114, the second bridge 112, and the first bridge 110 to the listener station 104. Accordingly, the reservation signaling, such as end-to-end "ACK" signaling, is transmitted to the listener station 104.

Figure 3:
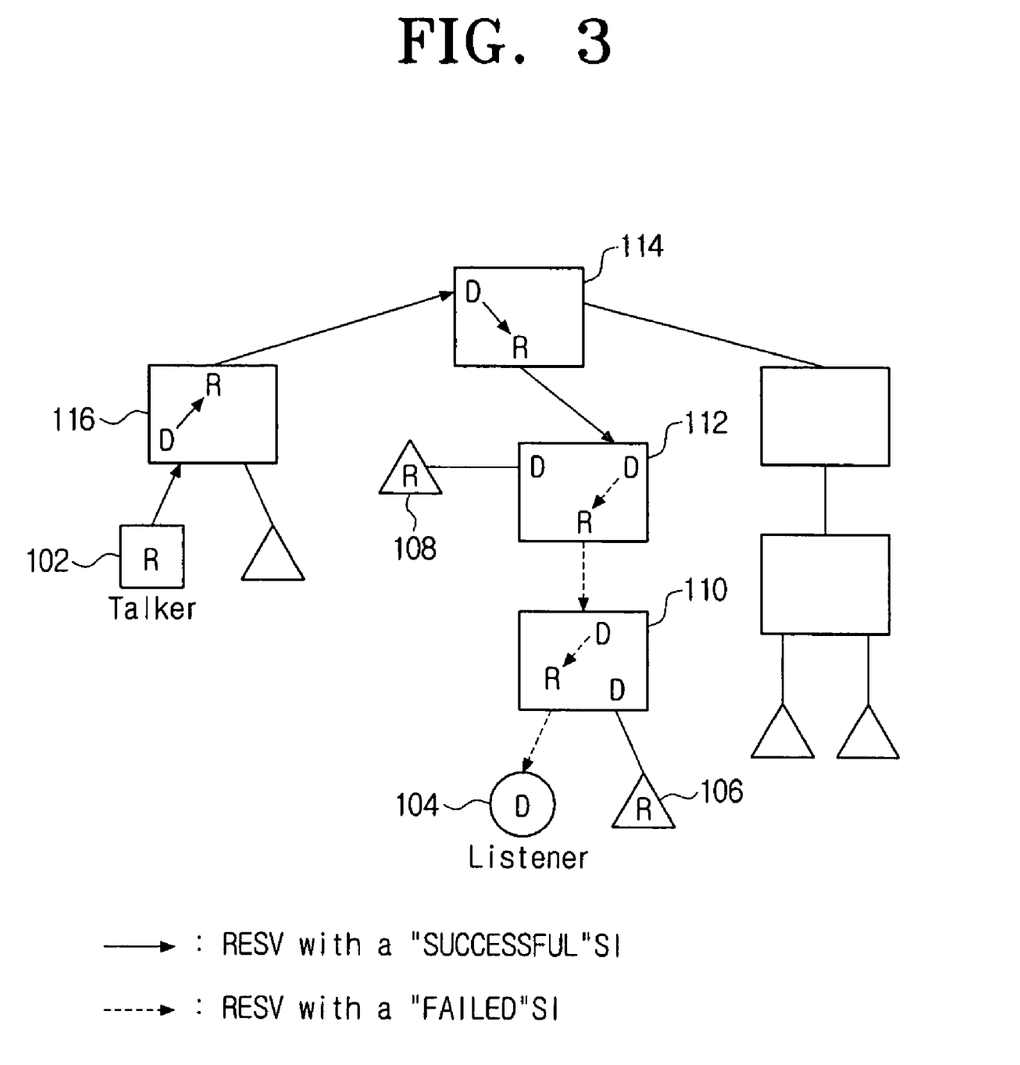
FIG. 3 is a view illustrating a failed example of a process transmitting reservation signaling from a talker station to a listener station in a guaranteed isochronous services method according to an exemplary embodiment of the present invention.

FIG. 3 is a view illustrating a failed example of a process transmitting reservation signaling from a talker station to a listener station in a guaranteed isochronous services method according to an exemplary embodiment of the present invention.

In FIG. 3, the reservation signaling frame is transmitted from the talker station 102 through the fourth bridge 116 and the third bridge 114 to the second bridge 112, and the transmission fails at the second bridge 112.

In other words, the admission control fails at the second bridge 112, and the status indication (SI) of the reservation signaling is set to FAILED.

Accordingly, the forwarding of the reservation signaling is stopped in the direction of the listener station 104, and the downstream bridges 112 and 110 do not lock resources as the SI of the reservation signaling is set to FAILED.

The listener station 104 recognizes the failure since the reservation signaling of FAILED SI is transmitted from the bridge 110 to the end-to-end "NACK".

Figure 4:
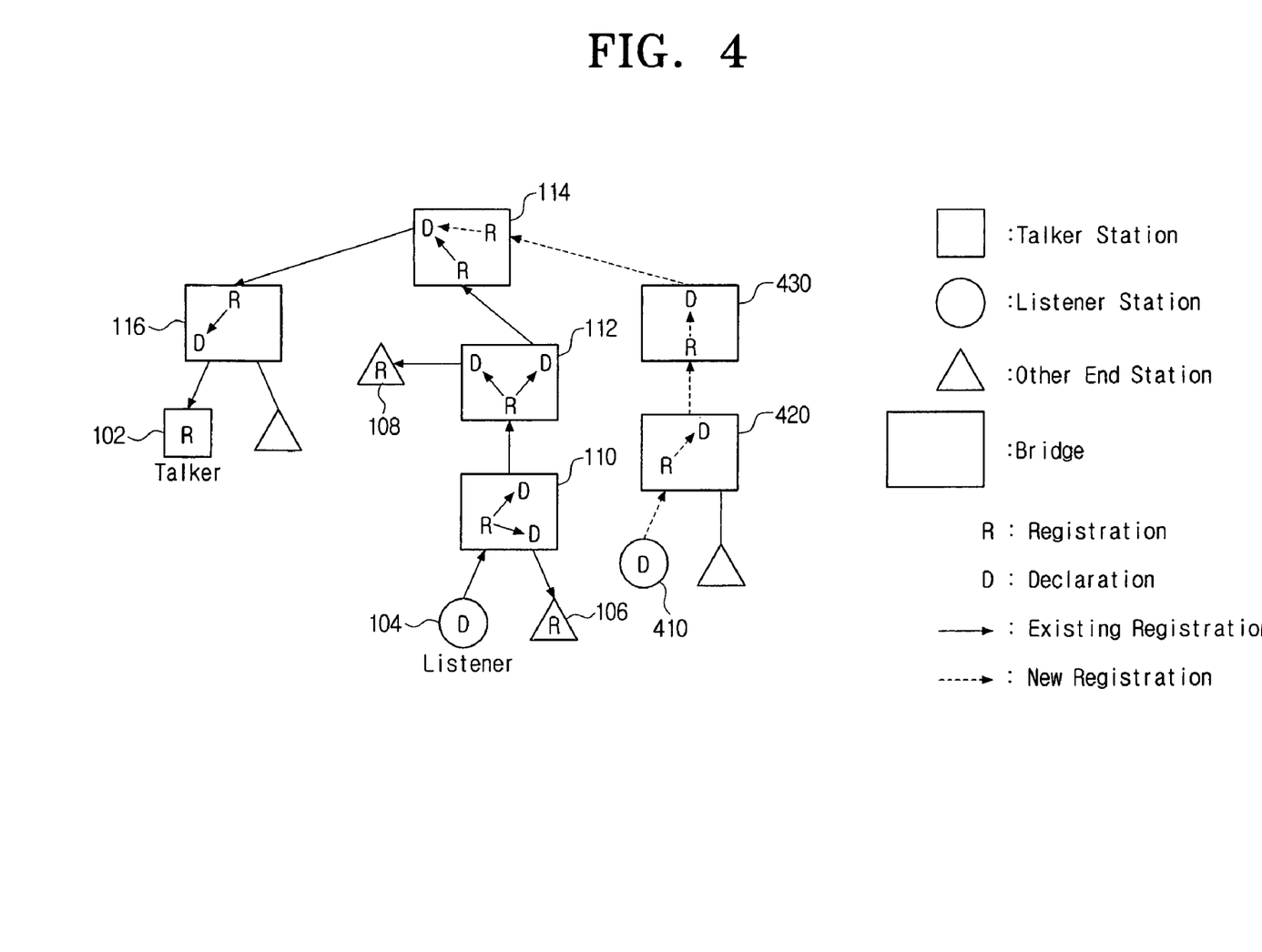
FIG. 4 is a view illustrating a process registering a second listener station when a first listener station is registered in a guaranteed isochronous services method according to an exemplary embodiment of the present invention.

FIG. 4 a view illustrating a process registering a second listener station when a first listener station is registered in a guaranteed isochronous services method according to an exemplary embodiment of the present invention.

As shown in FIG. 4, the first listener station 104 is registered in the isochronous services of the talker station 102 through the first bridge 110, the second bridge 112, the third bridge 114, and the fourth bridge 116. Under this circumstance, the second listener station 410 requests to be registered in the isochronous services via the fifth bridge 420 and the sixth bridge 430.

The path from the second listener station 410 via the fifth bridge 420 and the sixth bridge 430 is connected to the third bridge 114 according to multicast tree topology.

The third bridge 114 merges the registration request data from the second listener station 410 in a stream session with the registration of the first listener station 104 to transmit the data through the fourth bridge 116 to the listener station 102.

Figure 5:
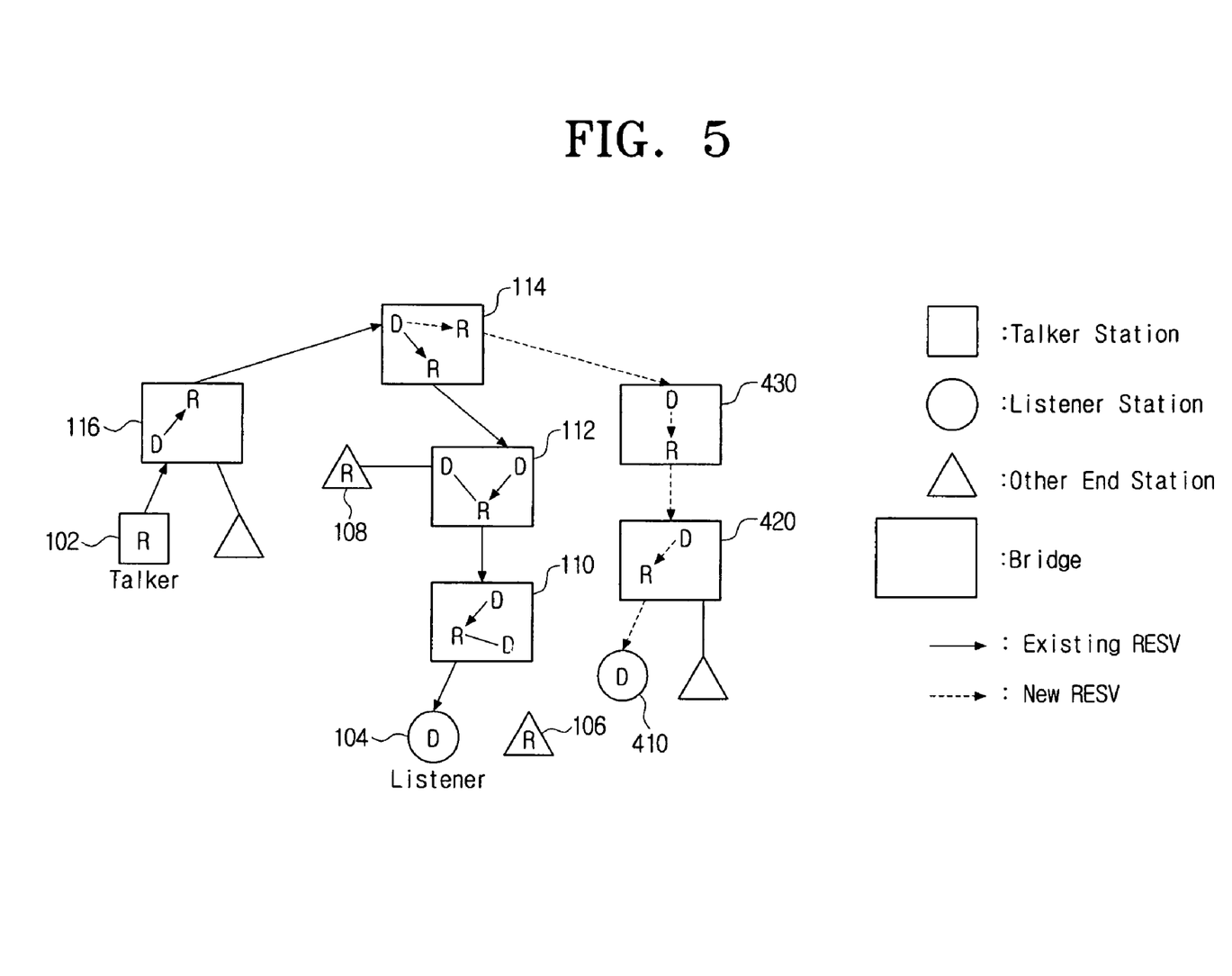
FIG. 5 is a view illustrating a process transmitting new reservation signaling to a second listener station in a guaranteed isochronous services method according to an exemplary embodiment of the present invention.

FIG. 5 is a view illustrating a process transmitting new reservation signaling to a second listener station in a guaranteed isochronous services method according to an exemplary embodiment of the present invention.

In FIG. 5, the talker station 102 transmits a new reservation signaling via the fourth bridge 116, the third bridge 114, the sixth bridge 430, and the fifth bridge 420 to the second listener station 410 upon receiving the registration request for the isochronous stream services from the second listener station 410. Here, the reservation response delay is disassociated from the reservation refresh timer value.

The SI of the new reservation signaling is set to either SUCCESSFUL or FAILED according to the reservation state in upstream.

The talker station 102 can make use of the stream membership information registered via GSRP to allow it to keep track of the set of streams for which active listeners currently exist.

The registration process and the reservation process are on the basis of soft-state signaling mechanism. Here, the status is periodically refreshed according to a hop-by-hop scheme. In both the registration process and the reservation process the signaling message is merged in the bridges.

The bridges 110-116 control each outbound port that specifies the forwarding or filtering of the isochronous frame according to the stream port map with the associated isochronous stream.

Figure 6:
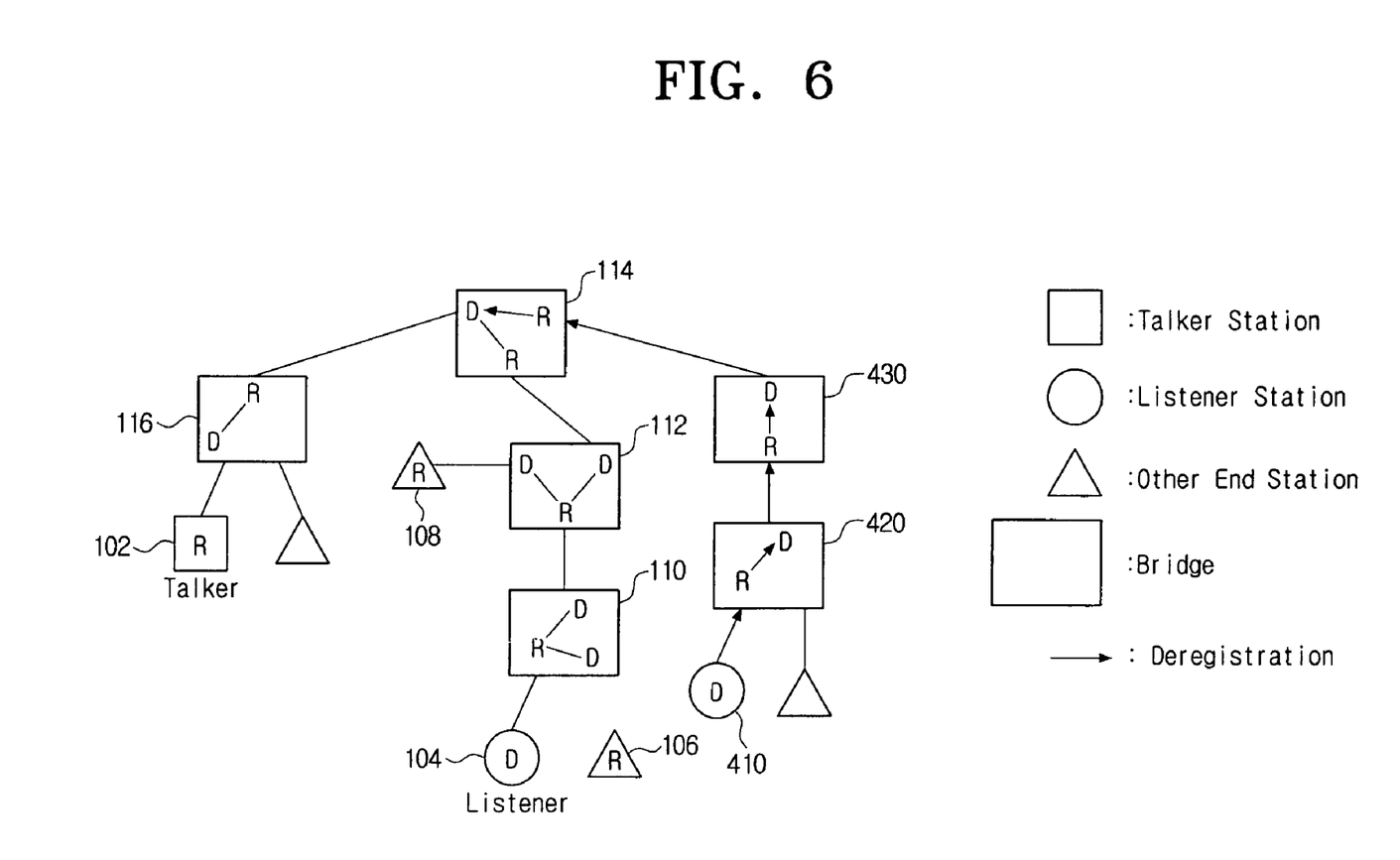
FIG. 6 is a view illustrating a process de-registering an isochronous stream in a guaranteed isochronous services method according to an exemplary embodiment of the present invention.

FIG. 6 is a view illustrating a process de-registering an isochronous stream in a guaranteed isochronous services method according to an exemplary embodiment of the present invention.

In FIG. 6, the second listener station 410 uses GARP de-registration to stop receiving isochronous stream.

The de-registration request data is transmitted from the second listener station 410 to the fifth bridge 420, the sixth bridge 430 and the third bridge 114.

Upon GSRP de-registration, the fifth bridge 420, the sixth bridge 430, and the third bridge 114 release the resource that has been previously locked for the second listener station 410.

Accordingly, other listener stations, including the first listener station 104, are not affected.

In the present embodiment, the GSRP is defined as GARP application such as GARP multicast registration protocol (GMRP) or GARP VLAN registration protocol (GVRP). The information registered, de-registered, and disseminated via this GARP application are the isochronous stream identifier information, and other optional service requirement information. The registration of stream identifier information makes bridges/end-stations aware that reservation for this stream should only be forwarded in the direction of the registered members of the stream. Therefore, the forwarding of reservation signaling frames for this stream occurs only on ports connected to registered members.

In setting up the isochronous stream, the address of the talker station of a certain stream is known. The signaling overhead can be reduced by purposely disseminating registration/de-registration information only in the direction of the talker. More specifically, the specification in IEEE 802.1D 2004 12.2.3 can be changed as follows: a) any "GID_Join.indication" received by a GIP (Generic Interface Processor) from a given port is propagated as a "GID_Join.request" to the instance of a GID (group identification/identifier) associated with each port who is a "forwarding" port for the corresponding talker address according to the bridge's FDB (forwarding database); and b) any "GID_Leave.indication" received by a GIP from a given port is propagated as a "GID_Leave.request" to the instance of a GID associated with each port who is a forwarding port for the corresponding talker address according to the bridge's FDB.

Each GARP application uses a unique group MAC address as the destination address of GARP protocol data units (PDUs). For example, GMRP address is assigned "01-80-C2-00-00-20", GVRP address is assigned "01-80-C2-00-0021", and GSRP address is assigned one as one of the unique group MAC address.

The GSRP message structure is conformance to GARP. Encoding of GSRP attribute values is based on the format of stream identifier, and includes talker address, reservation style, bandwidth, and the like.

An end system GSRP participant issues the message "GID_Join.request" as a join stream, and the message "GID.Leave.request" as a de-registration stream.

In case of registration and de-registration, on receipt of the message "GID_Join.indication", the GSRP application element specifies the associated port as forwarding in the reservation port map of the stream group registration entry for the reservation frames of the associated stream. If the stream group registration entry does not exist in the filtering database, a new stream group registration entry is created. If the reservation state has been established to successfully or failed in the bridge, the GSRP application element execute admission control (and resource locking/database updating if necessary) on the associated port for the associated stream, then issues corresponding reservation out of the port.

On receipt of the message "GID_Leave.indication", the GSRP application elements specifies the associated port as "filtering" in the reservation port map and "filtering" or "initial" in the stream port map of the stream group registration entry for the associated stream. If the reservation has been successful set up in the bridge for the associated port, the GSRP application element releases the locked resources. If, as a result of filtering, any port is not set in the reservation port map such as forwarding, the stream group registration entry is removed from the filtering database. If the filtering database entry does not exist in the filtering database, the indication is ignored.

In the above process, on receipt of the reservation signaling, the bridges 110-116 obtains the list of outbound ports which are set by GSRP as forwarding for the reservation signaling from the stream group registration entries. If the list is empty, the reservation signaling is discarded.

If the SI bits of the reservation are "SUCCESS", and the reservation is successful in upstream, the bridge checks on each outbound port whether the port has enough available resources for this stream. In case of ports, on which admission control is successful, if resource is not locked, the corresponding resource is locked. The port is specified as "forwarding" in the stream port map of the stream group registration entry for the associated stream. In the case of ports on which admission control is failed, it is affirmed that corresponding resource is not locked. It is also affirmed that the port is set to "filtering, admission control failure" in the stream port map of the stream group registration entry for the associated stream.

If the SI of the reservation is "FAILED" and the reservation is failed in upstream, the bridge affirms the corresponding resource is not locked for each port in the outbound ports list. The bridges also affirms that the port is set to "filtering, admission control failure" in the stream port map of the stream group registration entry for the associated stream.

In relaying the reservation message of the bridges, the "Forward" in the above description of the reservation message refers only to its logical meaning. Depend on the bridge's reservation state database, the actual relay operations can be either immediately or delayed. If the stream port map element state is newly changed, then a corresponding reservation message should be sent immediately out of that port. Otherwise, the reservation message will be sent out of the ports when the bridge's reservation refreshing timer is fired.

"Strictly guaranteed reservation" by operation of an admission control element can not be satisfied on a certain outbound port if the port is receiving the reservation resource requirements. The reservation with FAILED SI is sent out of this port. The downstream listener stations obtains explicit notification of this failure.

Even if receiving the reservation resource requirements, "Best-effort reservation" by operations of admission control element can not be satisfied on a certain outbound port, and the maximum allowable resource is reserved locally. On this outbound port, the reservation information is sent with the original resource requirement or the updated resource requirement. Also, it is sent with information about this dissatisfaction.

When the resources become available, a stream sets up "strictly guaranteed reservation" with "best-effort reservation" upon reservation refreshing. On receiving reservation signaling, the listener stations get notifications regarding if this stream is "strictly guaranteed reservation" or "best-effort reservation".

In authentication on the basis of port configuration of the bridges, for the authentication of the listener station, "registration forbidden" is used as the corresponding registrar administrative control value. The corresponding registrar instance ignores all GARP messages, and remains in the unregistered state. For the authentication of the talker station, the port ignores all reservation signaling frames that are associated with the restricted stream.

In authentication on the basis of key, the listener station or talker station should hold correct key (for example, the permitted MAC address, or password) to join the stream. According to different application, the key can be pre-configured in the bridges for either talker station or listener station, or both. The key can be provided by the talker station using the reservation signaling, and the listener station should hold the correct key to match. The key can be also provided by the listener station using registration procedure, and the talker station should hold the correct key to match.

Figure 8:
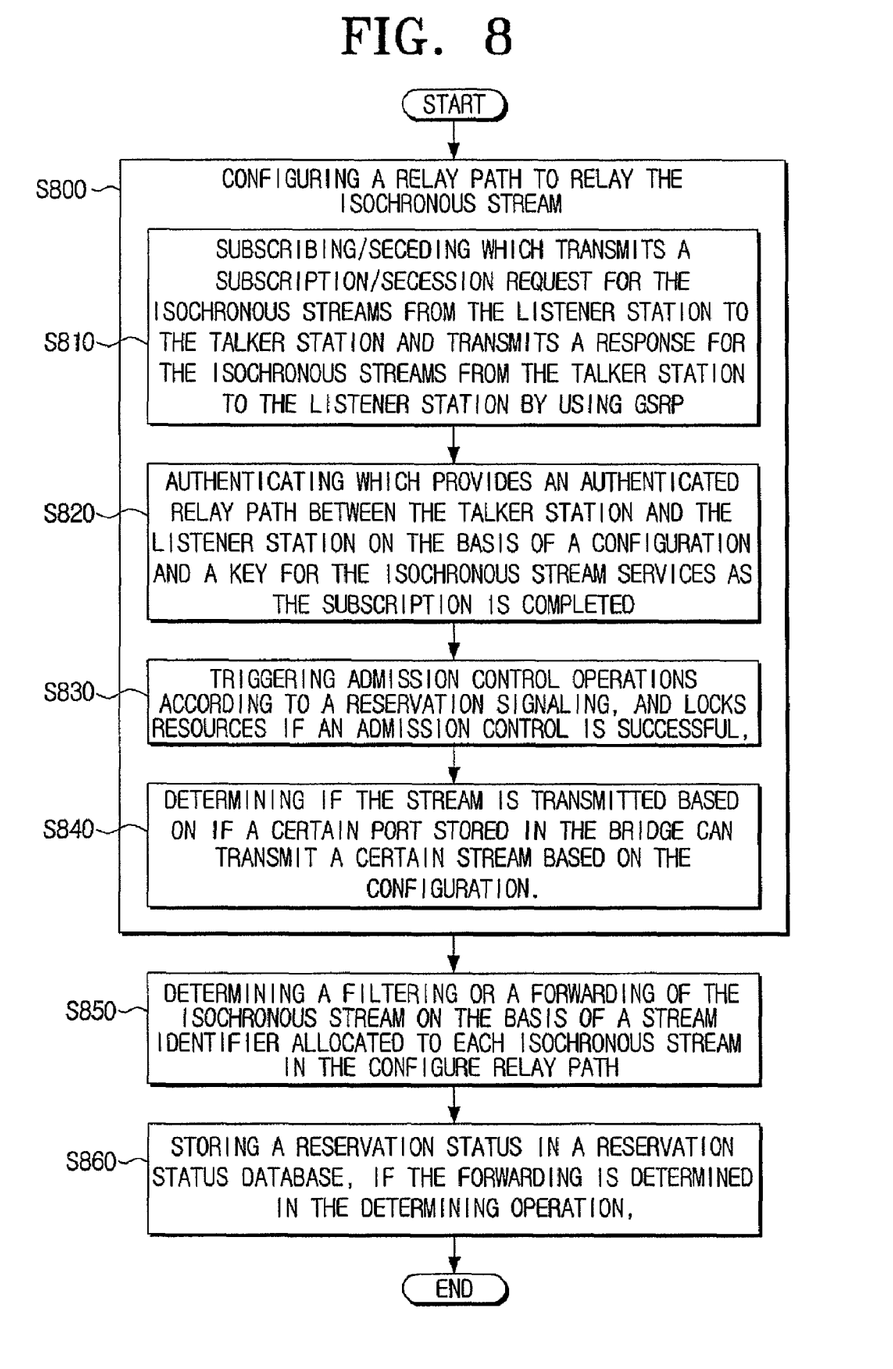
FIG. 8 is a flow chart detailing the process of relaying an isochronous stream from a talker station to a relay station according to an exemplary embodiment of the present invention.

FIG. 8 is a flow chart detailing the process of relaying an isochronous stream from a talker station to a listener station according to an exemplary embodiment of the present invention.

In operation S800, a relay path, in which isochronous streams are relayed between a talker station and a listener station, is configured by a path provider. Once the relay path is configured, a stream group filtering unit the determines whether the isochronous stream in the relay path is to be filtered or forwarded based on a stream identifier assigned to each isochronous stream (operation S850). Finally, if the isochronous stream is determined to be forwarded, the reservation status of the isochronous stream is stored in a reservation status database (operation S860).

Operation S800 includes a number of sub-operations. First, the stream subscription/secession protocol unit 713 transmits the request for the isochronous streams from the listener station 104 to the talker station 102 so as to register the isochronous streams in the talker station 102, and receives the reservation information for the isochronous streams from the talker station 102 to transmit to the listener station 104 using GSRP (sub-operation S810). Here, the subscription/secession protocol 713 is employed to manage isochronous streams by updating stream filtering database 755 of each bridge along the isochronous stream paths.

Next, the authentication unit 716 performs authentication between the talker station 102 and the listener station 104 on the basis of the configuration and the key of the bridges for the isochronous stream services, and authorizes connection of the accessible listener stations and talker stations in an isochronous session as the subscription is completed (sub-operation S820).

If an admission control is successful, the bridges triggers the admission control operations according to the reservation signaling, and locks resources (sub-operation S830).

Finally, based on whether a certain port stored in the bridge can transmit a certain stream based on the configuration, it is determined if the stream is transmitted (sub-operation S840).

As described above, according to exemplary embodiments of the present invention, filtering, stream group registration, and authentication are performed for the isochronous streams so that the quality of service (QoS) can be improved. Furthermore, the isochronous streams can be guaranteed to a plurality of listener stations.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A bridge apparatus that receives an isochronous stream from a talker station to relay to a listener station, the bridge apparatus comprising:

a path provider which configures a relay path to relay the isochronous stream; and a stream group filtering unit which determines a filtering or a forwarding of the isochronous stream on the basis of a stream identifier allocated to each isochronous stream for isochronous stream services in the configured relay path;

wherein the path provider comprises:

a stream subscription/secession protocol unit which transmits a subscription/secession request for the isochronous streams from the listener station to the talker station and transmits a response for the isochronous streams from the talker station to the listener station; and an authentication unit which provides an authenticated relay path between the talker station and the listener station on the basis of a configuration and a key for the isochronous stream services as the subscription is completed;

wherein the key is provided by one of the talker station and the listener station, and is held by the other of the talker station and the listener station.

2. The bridge apparatus as claimed in claim 1, wherein the stream identifier comprises a virtual local area network (VLAN) tag, a password, or media access control (MAC) address.

3. The bridge apparatus as claimed in claim 1, further comprising:
a reservation status data base;
wherein the stream group filtering unit forwards the isochronous stream depending on the reservation status database.

4. The bridge apparatus as claimed in claim 3, wherein the reservation status database comprises a stream filtering database that specifies a certain outbound port to forward or filter the isochronous stream.

5. The bridge apparatus as claimed in claim 4, wherein the isochronous stream is forwarded through the outbound port explicitly enabled in the stream filtering database.

6. The bridge apparatus as claimed in claim 4, wherein the stream filtering database comprises static filtering entries, dynamic filtering entries, group registration entries, and stream group registration entries.

7. The bridge apparatus as claimed in claim 6, wherein the stream group registration entries comprise an isochronous stream identifier, a reservation port map, and a stream port map.

8. The bridge apparatus as claimed in claim 7, wherein the reservation port map consists of a control element for each outbound port that specifies forwarding or filtering of reservation signal frame with the associated isochronous stream, and the stream port map consists of a control element for each outbound port that specifies forwarding or filtering of isochronous frames with the associated isochronous stream.

9. The bridge apparatus as claimed in claim 8, wherein in filtering, the stream port map has additional sub-states indicating the reason of filtering: "Initial", "Admission Control Failure", and "Time Out".

10. A guaranteed isochronous services method that receives an isochronous stream from a talker station and relays the stream to a listener station, the method comprising:
configuring a relay path to relay the isochronous stream; and
determining a filtering or a forwarding of the isochronous stream on the basis of a stream identifier allocated to each isochronous stream in the configured relay path;
wherein the operation of configuring relay path comprises:
subscribing/seceding which transmits a subscription/secession request for the isochronous streams from the listener station to the talker station and transmits a response for the isochronous streams from the talker station to the listener station; and
authenticating which provides an authenticated relay path between the talker station and the listener station on the basis of a configuration and a key for the isochronous stream services as the subscription is completed;
wherein the key is provided by one of the talker station and the listener station, and is held by the other of the talker station and the listener station.

11. The method as claimed in claim 10, wherein the stream identifier comprises a virtual local area network (VLAN) tag, a password, or media access control (MAC) address.

12. The method as claimed in claim 10, further comprising storing a reservation status in a reservation status database, if the forwarding is determined in the determining operation,
wherein the isochronous stream is forwarded depending on the reservation status database.

13. The method as claimed in claim 12, wherein the reservation status database comprises a stream filtering database that specifies a certain outbound port to forward or filter the isochronous stream.

14. The method as claimed in claim 13, wherein the isochronous stream is forwarded through the outbound port explicitly enabled in the stream filtering database.

15. The method as claimed in claim 14, wherein the stream filtering database comprises stream group registration entries, and the stream group registration entries comprise an isochronous stream identifier, a reservation port map, and a stream port map.

16. The method as claimed in claim 15, wherein the reservation port map consists of a control element for each outbound port that specifies forwarding or filtering of reservation signal frame with the associated isochronous stream, and the stream port map consists of a control element for each outbound port that specifies forwarding or filtering of isochronous frames with the associated isochronous stream.

17. The method as claimed in claim 10, wherein the operation of subscribing/seceding uses generic attribute registration/stream reservation protocol (GSRP).

18. The method as claimed in claim 10, wherein if an admission control is successful, the authenticating triggers admission control operations according to a reservation signaling, and locks resources.

19. The method as claimed in claim 10, wherein in the authenticating, the configuration determines if the stream is transmitted based on if a certain port stored in the bridge can transmit a certain stream.

* * * * *